United States Patent [19]

Tsukagoshi

[11] 3,791,600

[45] Feb. 12, 1974

[54] COMBINATION PINCH ROLLER DEPRESSER AND TURNTABLE BRAKE MECHANISM FOR ENDLESS TAPE CARTRIDGE

[75] Inventor: Tsunehiro Tsukagoshi, Tokyo, Japan

[73] Assignee: Pioneer Electronic Corporation, Tokyo, Japan

[22] Filed: Sept. 20, 1972

[21] Appl. No.: 290,600

[52] U.S. Cl. .......................... 242/55.19 A, 242/187
[51] Int. Cl. .......................... B65h 17/48
[58] Field of Search .... 242/55.19 A, 198, 197, 199, 242/200; 274/4 B; 179/100.2 Z; 226/186, 187

[56] References Cited

UNITED STATES PATENTS

| | | | |
|---|---|---|---|
| 3,350,025 | 10/1967 | Lear | 242/55.19 A |
| 3,620,467 | 11/1971 | Usom | 242/55.19 A |
| 3,712,552 | 1/1973 | Wada | 242/55.19 A |

FOREIGN PATENTS OR APPLICATIONS

| | | | |
|---|---|---|---|
| 424,301 | 5/1967 | Switzerland | 242/55.19 A |

*Primary Examiner*—Billy S. Taylor
*Attorney, Agent, or Firm*—Sughrue, Rothwell, Mion, Zinn & Macpeak

[57] ABSTRACT

An endless tape cartridge includes a two-step pinch roller, the larger diameter portion of which is engageable with a capstan when inserted in a player to rotate the pinch roller. The tape is fed from and back to a turntable between the smaller diameter pinch roller portion and a pressing roller carried by a leaf spring. A pivoted, L-shaped brake lever has a brake member on one end adjacent to the truntable and is coupled to the leaf spring at its opposite end. When the cartridge is removed from play position on the player, the leaf spring applies the brake member against the turntable and restrains the pressing roller from forceful contact with the pinch roller.

2 Claims, 4 Drawing Figures

COMBINATION PINCH ROLLER DEPRESSER AND TURNTABLE BRAKE MECHANISM FOR ENDLESS TAPE CARTRIDGE

BACKGROUND OF THE INVENTION

1. Field of the Invention

This invention relates to the field of mangetic tape recording and sound reproduction, and more particularly to an endless tape cartridge wherein the running speed of the tape may readily change.

2. Description of the Prior Art

In conventional sound reproduction devices where an endless magnetic tape cartridge is employed and wherein the tape speed is essentially constant, two methods have been proposed for increasing the sound reproduction. The first method consists of increasing the amount of tape included in the cartridge by reducing the thickness of the tape and reproducing the sound of the increased length of tape at a predetermined tape speed, while the second method consists of forming the pinch roller forming a part of the endless tape cartridge, with a small diameter portion and a large diameter portion defining a two-step pinch roller, and urging the large diameter portion of the pinch roller into contact with the capstan for driving the same and to thereby conduct the rotating power to the pinch roller while the small diameter portion of the pinch roller is depressed towards a depressing roller with the inner position of the magnetic tape therebetween so that the magnetic tape is driven at a speed determined by the ratio of the diameters of the two-step pinch roller sections.

The present invention relates to the second method and a conventional form of the second method is now described with reference to FIGS. 1 and 2. As is apparent from viewing FIG. 1, a loop of the endless tape 11 extends from the tape hub 12 being drawn from the innermost convolution of a tape coil 20, the loop passing through the slot within the tape guide wall 13 and past a tape guide 14 and over two pads 16 and 17, with the small diameter portion 18 of the two-step pinch roller 28 carrying the loop. The loop continues to pass between the small diameter portion 18 of the two-step pinch roller and the depressing roller 19 and to return to the coil at the outer convolution of the endless tape coil 20. The two-step pinch roller 28 is of a construction illustrated in FIG. 2 by essentially providing a groove within the center of a conventional pinch roller, whereby the large diameter portion 30 are formed to the outside of the roller and to each side of a small diameter portion 18. In the conventional two-step method, the depressing roller 19 is always resiliently biased against the small diameter portion 18 of the two-step pinch roller 28 during both the playing and non-playing of the tape recorder by means of a resilient holding plate or leaf spring 21, the tape 11 being disposed about and between the small diameter portion 18 of the two-step pinch roller 28 and the depressing roller 19. Accordingly, when the capstan 29 is relatively depressed onto and against the large diameter portion 30 of pinch roller 28 during the playing of the tape recorder or reproducer, the two-step pinch roller 28 is rotated thereby and the tape 11 is shifted at a reduced speed depending upon the ratio of the diameters of the large diameter portion 30 and the small diameter portion 18 of the two-step pinch roller 28. The resiliency of the holding plate or leaf spring 21 permits the two-step pinch roller to pivot on a support lever 31 about a pivot axis defined by pin 32 in a clockwise direction as indicated by the arrow A, which depression is permitted by shifting of the depressing roller 19 in the direction of arrow B by the resiliency of the holding plate or leaf spring 21.

However, the conventional method of effecting a desired speed reduction in the movement of the tape 11 during reproduction has various shortcomings. First, the small diameter portion 18 of the two-step pinch roller 28 tends to be deformed because of the continuous contact with the depressing roller 19, irrespective of whether the tape recorder is in a playing or non-playing mode, thereby creating irregularities in the running speed of the magnetic tape 11. Secondly, there is no brake for the turntable 27 supporting the magnetic tape coil 20 and thereby the turntable 27 may rotate for various reasons such as a result of vibration and the tape 11 may be slackened at various points and may be damaged. Thirdly, difficulties are experienced when the tape 11 is inserted within the cartridge or replaced because there is no brake provided for turntable 27.

The present invention is directed to overcome all of the above described shortcomings.

One object of the present invention is to provide an endless tape cartridge wherein the deformation of the small diameter portion of the two-step pinch roller may be effectively prevented and whereby irregularities in the running speed of the magnetic tape may be substantially eliminated.

Another object of the present invention is to provide an endless tape cartridge where slackening of the tape caused by various reasons such as vibration, may be prevented and possibilities of damage to the tape as a result of such slackening may be substantially eliminated.

A third object of the present invention is to provide an endless tape cartridge permitting the insertion or replacement of the tape which may be easily carried out.

DESCRIPTION OF THE PREFERRED EMBODIMENT

Figure 1:
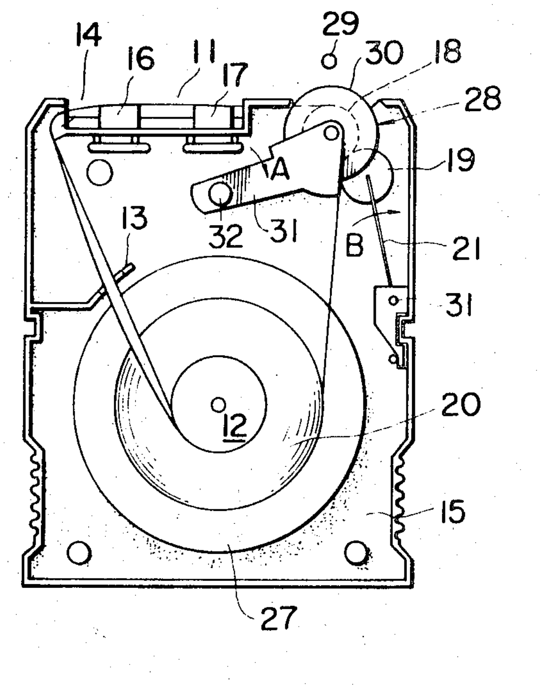
FIG. 1 PRIOR ART
FIG. 1 is a top plan view of a conventional magnetic tape cartridge with a cover plate removed for easily viewing the internal components.
Figure 2:
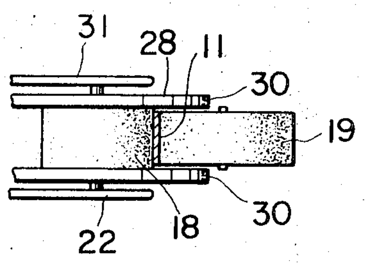
FIG. 2 PRIOR ART
FIG. 2 is a side view of the inter-relatsionhip between the two-step pinch roller and the depressing roller of the prior art cartridge of FIG. 1.
Figure 3:
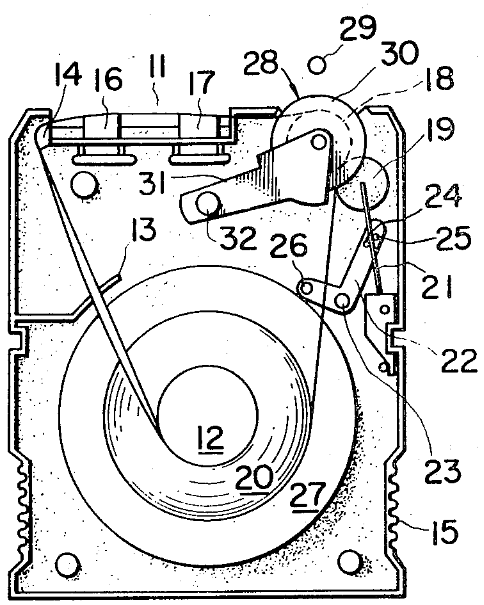
FIG. 3 is a top plan view of a magnetic tape cartridge incorporating the present invention in one form, with the components in non-operating condition.
Figure 4:
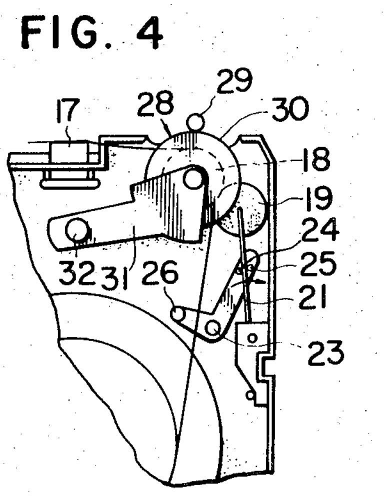
FIG. 4 is a partial, top plan view of the cartridge of FIG. 3 with the components in operating condition.

Referring to FIGS. 3 and 4, an embodiment of the present invention is illustrated in conjunction with a magnetic tape recorder cartridge similar in construction to the prior art arrangement of FIGS. 1 and 2, and similar components are given similar numerical designations. In this respect, in addition to all of the components illustrated in the prior art construction of FIGS. 1 and 2, there is further included a braking lever 22 which is generally L-shaped in configuration and is pivotably mounted at the intersection of the two legs by means of a pivot pin 23 fixed to an internal portion of the cartridge. One end of the braking lever 22 supports a brake element 26 which faces the turntable 27 and is biased against the same by a resilient holding plate or leaf spring 21. The other end of the braking lever 22 supports a pair of projections 24 and 25 which extend outwardly therefrom on each side of the resilient holding plate or leaf spring 21 so as to capture the spring therebetween intermediate of a lower fixed end and an upper fixed end which in similar manner to the prior art structure of FIG. 1, supports a depressing roller 19, and tends to press the depressing roller 19 against the periphery of the small diameter portion 18 of the two-step pinch roller 28. In terms of this modified structure, a resilient force due to the presence of the leaf spring or resilient holding plate 21 is applied during the inoperative state of the magnetic tape cartridge to projection 24 on the braking lever 22, thus biasing the braking lever counterclockwise to the extent that the braking element 26 at the other end of the braking lever 22 is urged against the turntable 27 retarding rotation of the same. At the point where the braking element 26 of the braking lever 22 contacts the turntable 27, further counterclockwise rotation of the braking lever 22 about the pivot axis 23 is thereby prevented. Thus, the movement of the resilient holding plate or leaf spring 21 is restricted by projection 24 and the depression of the depressing lever roller 19 toward the small diameter portion 18 of the two-step pinch roller 28 ceases without contact between the peripheries of the small diameter portion 18 of the two-step pinch roller 28 and the depressing roller 19.

When it is desired to play the tape carried by the cartridge, the cartridge 15 is inserted into a reproducing device (not shown) to the extent that the large diameter portion 30 of the two-step pinch roller 28 is brought into contact with capstan 29 of the reproducing device. Contact causes the large diameter portion 30 of the two-step pinch roller 28 to pivot in a similar manner to the prior art arrangement of FIG. 1 to rotate about pivot shaft 32 in a clockwise direction and the cartridge is brought into an operating state as indicated in FIG. 4. In this case, the clockwise shifting of the two-step pinch roller 28 is sufficient to cause contact of both the small diameter portion 18 of the pinch roller 28 and the depressing roller 19 with tape 11 sandwiched therebetween and cause a deflection of the resilient holding plate or leaf spring 21 in the direction of the arrow, FIG. 4. This deflection force is applied against the second projection 25 at the end of the braking lever 22, causing the lever 22 to rotate clockwise. The clockwise rotation of the braking lever 22 releases the braking element 26 at the other end of the braking lever 22 from its contact with the periphery of the turntable 27 and the turntable 27 may rotate freely as a result of elimination of the braking force. The endless tape 11 is then driven as desired and the cartridge is now in the operating state.

As stated previously, according to the present invention, first the deformations of the small diameter portion of the two-step pinch roller and the pressing roller is eliminated since contact occurs only during the operative mode of the recorder. Secondly, damage to the tape is prevented, since the braking force is effectively provided on the turntable except at the time of operation in a reproduction or recording mode. Thirdly, handling of the cartridge at the time of insertion and replacement is facilitated because the brake acting on the turntable tends to maintain the tape during transport of the same. These features of the present invention contribute greatly to the utility of the endless tape cartridge incorporating the features described above.

What is claimed is:

1. In an endless tape cartridge for use in a tape recorder wherein said cartridge includes a turntable supporting an endless tape in coil form, means permitting a loop to be removed from said coil for engagement about a small diameter portion of a two-step pinch roller and between said small diameter portion of said two-step pinch roller and a spring biased depressing roller and means for mounting said pinch roller at one end of a pivotable lever with the small diameter portion depressable against said depressing roller as the result of contact between a large diameter portion of said two-step pinch roller and a tape drive capstan during insertion of said cartridge within said tape recorder, the improvement comprising:

a lever pivotingly mounted within said cartridge and having at one end a braking member mounted for contact with the periphery of said turntable for braking the same, and means operatively positioning said lever relative to said spring biased pressing roller such that normally said braking means is pressed against the periphery of said turntable and said pressing roller is restrained from contact with the small diameter portion of said two-step pinch roller, but upon insertion of said tape cartridge into said tape recorder depression of said two-step pinch roller as a result of contact between the large diameter portion of said pinch roller and said capstan causes depression of said depressing roller and pivoting of said brake lever to release said braking member from peripheral contact with said turntable.

2. The endless tape cartridge as claimed in claim 1, wherein said braking lever is L-shaped in configuration, is pivoted at the intersection of its arms thereof, said means for resiliently biasing said depressing roller comprises a leaf spring extending across the end of said lever arm not carrying said braking member, and said braking lever carries first and second pins fixed thereto sandwiching said leaf spring therebetween, said leaf spring engaging said braking lever such that said leaf spring normally bears on the first pin closest to the pivot axis of said lever in the absence of contact between said capstan and said pinch roller to press the braking member into peripheral contact with said turntable and to prevent peripheral contact between said spring biased pressing roller and the periphery of the small diameter portion of said two-step pinch roller, and wherein said second pin is located on said pivotable braking lever such that upon depression of said pinch roller, said pinch roller acting through said tape and on said depressing roller, causes said leaf spring to contact said second pin and to pivot said braking member away from peripheral contact with said turntable.

* * * * *